(12) United States Patent
Jaeger

(10) Patent No.: US 8,693,495 B2
(45) Date of Patent: Apr. 8, 2014

(54) WIRELESS NETWORK MEDIUM ACCESS CONTROL PROTOCOL

(75) Inventor: Morten Gravild Bjerregaard Jaeger, Phuket (TH)

(73) Assignee: HP Ventures A/S (DK)

( * ) Notice: Subject to any disclaimer, the term of this patent is extended or adjusted under 35 U.S.C. 154(b) by 314 days.

(21) Appl. No.: 12/945,989

(22) Filed: Nov. 15, 2010

(65) Prior Publication Data

US 2012/0120871 A1 May 17, 2012

(51) Int. Cl.
*H04L 12/43* (2006.01)

(52) U.S. Cl.
USPC ........................................ 370/461; 370/447

(58) Field of Classification Search
USPC ......... 370/342, 345, 347, 348, 431, 445, 447, 370/458, 461
See application file for complete search history.

(56) References Cited

U.S. PATENT DOCUMENTS

| | | | |
|---|---|---|---|
| 2005/0249167 A1* | 11/2005 | Salokannel | 370/336 |
| 2006/0092909 A1* | 5/2006 | Ho | 370/348 |
| 2006/0239220 A1* | 10/2006 | Celentano et al. | 370/328 |
| 2006/0268891 A1 | 11/2006 | Heidari-Bateni et al. | |
| 2006/0268908 A1 | 11/2006 | Wang et al. | |
| 2007/0019607 A1* | 1/2007 | Sugaya et al. | 370/347 |
| 2007/0153717 A1* | 7/2007 | Tervonen et al. | 370/320 |
| 2007/0213012 A1* | 9/2007 | Marin et al. | 455/63.3 |
| 2008/0137577 A1* | 6/2008 | Habetha | 370/311 |
| 2008/0259877 A1* | 10/2008 | Habetha | 370/336 |
| 2008/0259895 A1* | 10/2008 | Habetha et al. | 370/345 |
| 2009/0092123 A1* | 4/2009 | Aoki | 370/350 |
| 2009/0213771 A1 | 8/2009 | Celentano et al. | |
| 2009/0232001 A1 | 9/2009 | Gong et al. | |
| 2009/0279487 A1 | 11/2009 | Reumerman et al. | |
| 2009/0310573 A1 | 12/2009 | Sim et al. | |
| 2010/0040042 A1 | 2/2010 | Van Greunen et al. | |
| 2010/0329232 A1* | 12/2010 | Tubb et al. | 370/345 |

FOREIGN PATENT DOCUMENTS

| | | |
|---|---|---|
| EP | 1473870 A2 | 11/2004 |
| WO | 00/48367 A2 | 8/2000 |
| WO | 2005/076544 A1 | 8/2005 |
| WO | 2005/094007 A1 | 10/2005 |

OTHER PUBLICATIONS

Extended Search Report, European Patent Application No. EP 11173407.5, dated Jan. 19, 2012, 11 pages.
Wimedia Alliance, "Distributed Mediumaccess Control(MAC) for Wirelessnetworks; MAC Specification: Release 1.5", Nov. 1, 2009, Retrieved from the Internet: URL:http://www.wimedia.org/en/docs/091819r01 aWM_BOD-only-Specification_1.5.pdf [retrieved on Jan. 19, 2012].

* cited by examiner

*Primary Examiner* — Paul H Masur
(74) *Attorney, Agent, or Firm* — Lewis, Rice & Fingersh, L.C.

(57) ABSTRACT

A method for a device to communicate in one operational mode over a wireless network uses any suitable media access control mechanism for periodically communicating scheduled data transmission information between nodes. Scheduled data is then periodically transmitted according to the scheduled data transmission information and neighbor scheduled data is periodically listened for according to the neighbor scheduled data transmission information. Finally, the device is otherwise allowed to enter in a different operational mode.

17 Claims, 11 Drawing Sheets

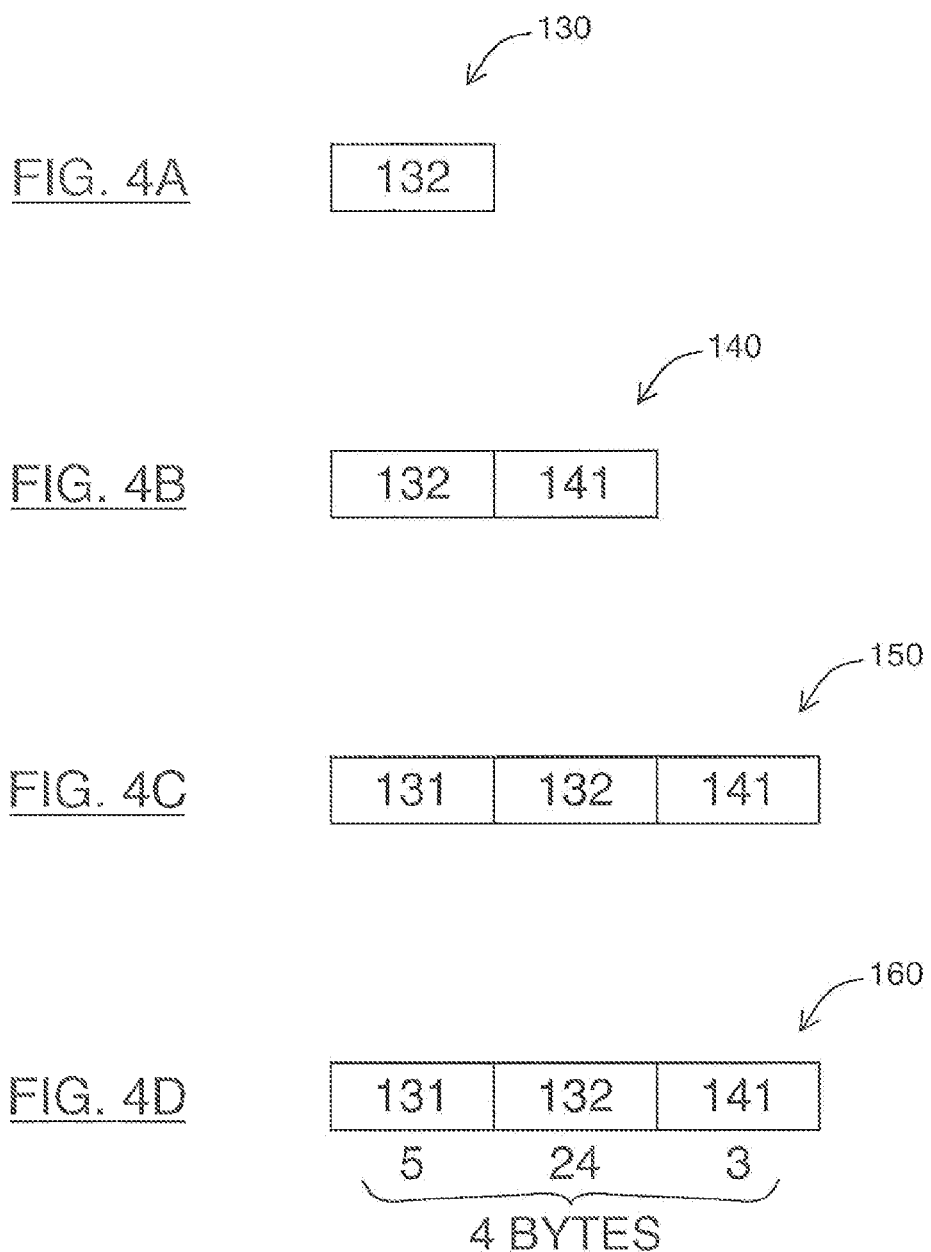

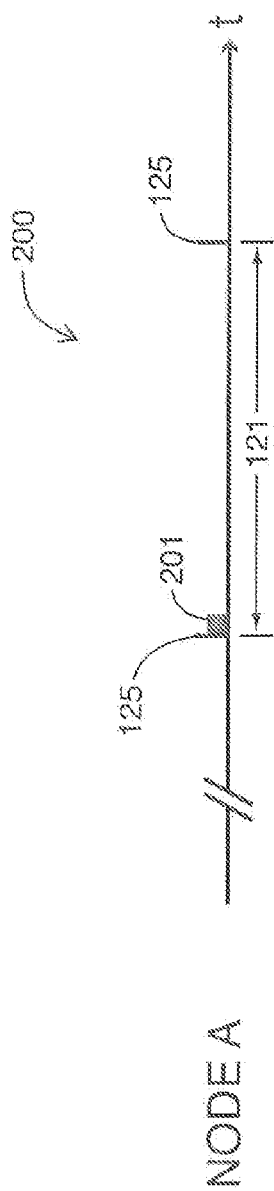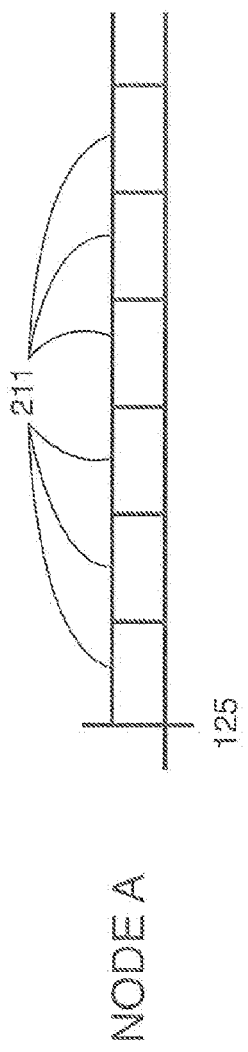

WIRELESS NETWORK MEDIUM ACCESS CONTROL PROTOCOL

FIELD

The embodiments described herein relate to a method and device for communication over shared channels in a network.

BACKGROUND

A network can be defined as the interconnection of various devices, referred to herein as nodes. Whenever there are multiple nodes transmitting on the same radio frequency, there is a likelihood that two or more nodes will transmit at the same time, causing a collision. The Medium Access Control (MAC) layer deals with the problem of how to control access to the shared channel. Some of the well-known methods of media access control include Pure ALOHA, Slotted ALOHA, Persistent and Nonpersistent Carrier Sense Multiple Access (CSMA).

In some cases, each node in a network can hear transmissions from all other nodes. Nodes will then refrain from transmitting data when other nodes are transmitting. Whether the nodes are trying to use the media is most often determined by detecting the carrier of the one or more transmitting nodes.

In other cases, however, each node in a network can only hear transmissions from its neighbor nodes. Some media access control protocols teach the partitioning of the communication bandwidth into frames that are divided into media access slots, where some slots are reserved as a beacon period and remaining slots are used for data transmission.

SUMMARY

The embodiments described herein provide in one aspect, a method for a device to communicate in one operational mode over a wireless network, the method comprising: transmitting a beacon according to a media access control protocol during a beacon interval of a beacon period, the beacon comprising scheduled data transmission information; receiving one or more neighbor beacons transmitted by one or more neighbor devices according to the media access control protocol during the beacon interval of the beacon period, each neighbor beacon comprising neighbor scheduled data transmission information; periodically transmitting scheduled data according to the scheduled data transmission information; periodically listening for neighbor scheduled data according to the neighbor scheduled data transmission information; and allowing the device to enter into a different operational mode.

The embodiments described herein provide in another aspect, a device for communicating over a wireless network, the device comprising: a transmitter; a receiver; and a processor coupled to the transmitter and receiver, the processor configured to, in one operational mode: cause the transmitter to transmit a beacon according to a media access control protocol during a beacon interval of a beacon period, the beacon comprising scheduled data transmission information; cause the receiver to receive one or more neighbor beacons transmitted by one or more neighbor devices according to the media access control protocol during the beacon interval of the beacon period, each neighbor beacon comprising neighbor scheduled data transmission information; cause the transmitter to periodically transmit scheduled data according to the scheduled data transmission information; cause the receiver to periodically listen for neighbor scheduled data according to the neighbor scheduled data transmission information; and allow the device to enter into a different operational mode.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIGS. 4A to 4D illustrate a beacon according to various embodiments;

FIGS. 5A and 5B illustrate a beacon period according to various embodiments;

DETAILED DESCRIPTION

Figure 1A:
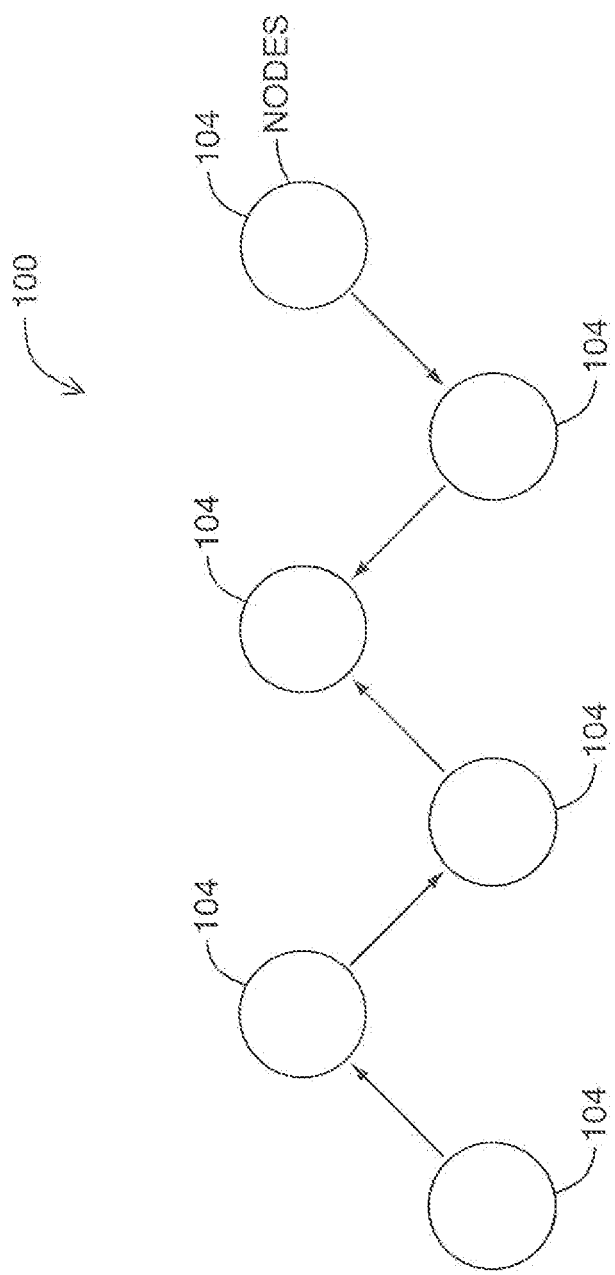
FIG. 1A is a schematic illustration of an example of a network topology.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor and a data storage system (including volatile and non-volatile memory and/or storage elements). For example and without limitation, the programmable computers may be any device containing one or more computational devices in the form of a microprocessor or a microcontroller, a personal computer, laptop, personal data assistant, and cellular telephone. In some embodiments, the computers can include dedicated devices that comprise sensors. Such devices can be referred to as sensor nodes and will be described in further detail below.

Each program can be implemented in a high level procedural or object oriented programming and/or scripting language to program a computer system. In addition, the programs can be implemented in assembly or machine language, if desired. Furthermore, the programs can be implemented in a logic based programming language, such as Prolog. In some cases, the language may be a compiled or interpreted language. Each such program is preferably stored on a storage media or a device (e.g. ROM or magnetic disk) readable by a general or special purpose programmable computer, which as mentioned above may comprise a microcontroller, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the system, processes and methods of at least the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled, non-compiled code, machine code, source code and an embedded program.

In some of the embodiments of the systems and methods described herein, at least some of the communication is radio frequency (RF). In some embodiments, one or more electrochemical cells may power the systems and devices. In other embodiments, the systems and devices may be powered in other ways, such as, for example, but not limited to solar cells, electromagnetic induction, Peltier cells, or piezo electric power.

In some embodiments, the devices operating on electrochemical cells are designed to have a prolonged life. In some embodiments, devices are designed to have a service life of 10 years or longer. In some embodiments, the network is intended to operate on the internationally free ISM (Industrial, Scientific, Medical) band at 2.4 GHz, which requires a low duty cycle of the transmitters and tends to be noisy compared to licensed bands.

Although the described embodiments may be particularly advantageous for networks, their use is not limited to wireless networks and the advantages of the described embodiments may be applicable to communications between other network nodes. In a wireless network, a node is typically not within the range of all other nodes; rather a node is only within the range of its immediate neighbor node or neighbor nodes. This is especially true when dealing with low power transmitters.

Referring to FIG. 1A, therein illustrated is an example of network topology. In the example embodiment, the layout may be for that of a network, shown generally as 100. Network 100 comprises one or more nodes 104. In some embodiments, at least some nodes 104 include one or more sensors for sensing one or more conditions. In some such embodiments, nodes 104 may be referred to as sensor nodes and network 100 may be referred to as a sensor network. It should be understood that even in embodiments where network 100 is referred to as a sensor network, not all nodes in network 100 need to employ sensors, although they may be referred to as sensor nodes or simply "nodes". For example, in some embodiments, some nodes may provide connectivity to other devices such as, for example, but not limited to, satellites or to other networks such as, for example, but not limited to, the Internet.

In some embodiments, nodes 104 of network 100 may be powered by one or more electrochemical cells. In some embodiments, some nodes in network 100 may have connections to a power source such as a power grid while other nodes may be powered by one or more galvanic cells.

In some embodiments where network 100 is a sensor network, at least some nodes 104 may be operable to collect data from the physical environments in which they are placed. For example, nodes 104 may be sensor nodes and may be deployed in a physical environment such as a forest for collecting environmental data regarding meteorological phenomenon such as precipitation. In some other embodiments, nodes 104 may be installed in buildings to measure water or other utility usage. It should be understood that these are examples only and are not intended to be limiting.

Figure 1B:
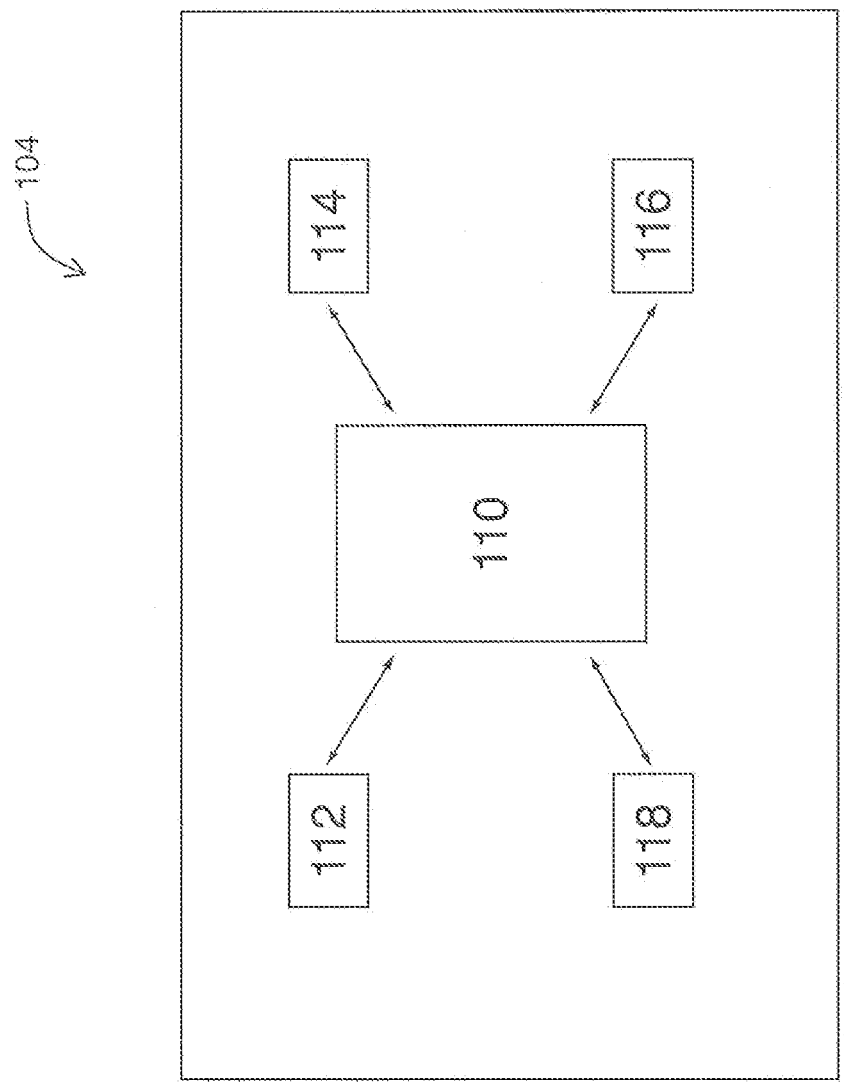
FIG. 1B is a block diagram of a node according to various embodiments.

Reference is now made to FIG. 1B, which illustrates a node 104 according to various embodiments where node 104 is a sensor node. Node 104 includes a processor 110, memory 112, a power source 114, a communication interface 116 and a sensor 118. In some embodiments, communication interface 116 comprises a transmitter for transmitting information to other nodes and a receiver for receiving information from other nodes. In some embodiments, communication interface 116 comprises a transceiver. The description that follows will refer to the receiver and transmitter separately. However, people skilled in the art will understand that a transceiver could instead be utilized. In various embodiments, and as previously discussed, the power source 114 can include but is not limited to electrical power from chemical reactions (e.g. a galvanic cell), solar cells, capacitive electrical storage, piezo electric power, power generated by magnetic inductance and combinations thereof.

In some embodiments, node 104 is designed to be as small and lightweight as possible and therefore may have limited computing resources both in terms of processing power and available memory. In addition, in various embodiments, node 104 may have limited power resources.

In some embodiments, all nodes 104 may be sensor nodes and therefore may include one or more sensors 118. In some embodiments, all nodes 104 may not include sensors 118 and therefore may not be sensor nodes. In some embodiments, some nodes 104 may include sensors while some nodes 104 may not include sensors.

In addition to having limited resources, in some embodiments, sensor nodes 104 may be deployed in a way or located under circumstances that may inconvenience the upgrade, replacement or replenishment of any parts or resources used during the operation, or consumed by the operation of the node. For example, they may be embedded into buildings behind cement walls, or be deployed randomly in a forest such that they are difficult to physically locate. Accordingly, it is advantageous for nodes 104 to employ a method of communicating over a network that requires minimal computational (processing and memory) and battery resources. In various embodiments node 104 can meet harsh low energy requirements such that it can operate for extended periods of time at appropriate performance levels despite limits in terms of its energy source. Such objectives may be achieved by minimizing the number of times the transmitter turns on to transmit and the receiver turns on to receive at the nodes 104, the number of collisions that takes place in the shared channel, and the duration of time for which the receiver and the transmitter are operating.

Known MAC protocols that propose collision avoidance schemes are generally best suited for a media where all communication is received by all nodes in a network. Collisions can be detected either directly at a lower level, or at a higher level. For example, with Ethernet, a special modulation scheme (Manchester Encoding) is used that can facilitate collision detection by using specialized analog circuitry. In the absence of such special encoding schemes and specialized hardware circuitry, collisions generally cannot be detected in this direct way. Instead, it may be detected at a higher level. This may be done, for instance, by using a Cyclic Redundancy Check (CRC) or by employing handshaking to detect that a frame was correctly received. However, since not all the data is received by all nodes 104 in a RF communication, this may give rise to complexity because of hidden and exposed terminal problems.

Figure 1C:
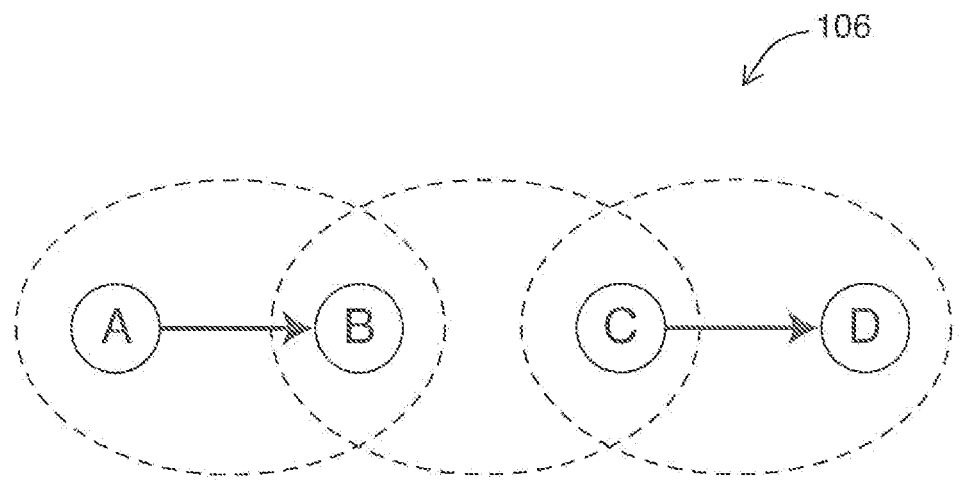
FIGS. 1C and 1D illustrate the hidden and exposed terminal problem respectively.

As illustrated in FIG. 1C, the so-called hidden terminal problem is the problem of a node 104 not being able to detect an ongoing transmission from one node 104 to another because the transmitting node 104 is out of range. As shown in FIG. 1C, node A is in the process of transmitting to node B. Since node A is out of range and therefore hidden from node C, node C does not know of the transmission. If node C begins transmitting as well, it will interfere with the reception at node B possibly resulting in collision. This is the hidden terminal problem.

Figure 1D:
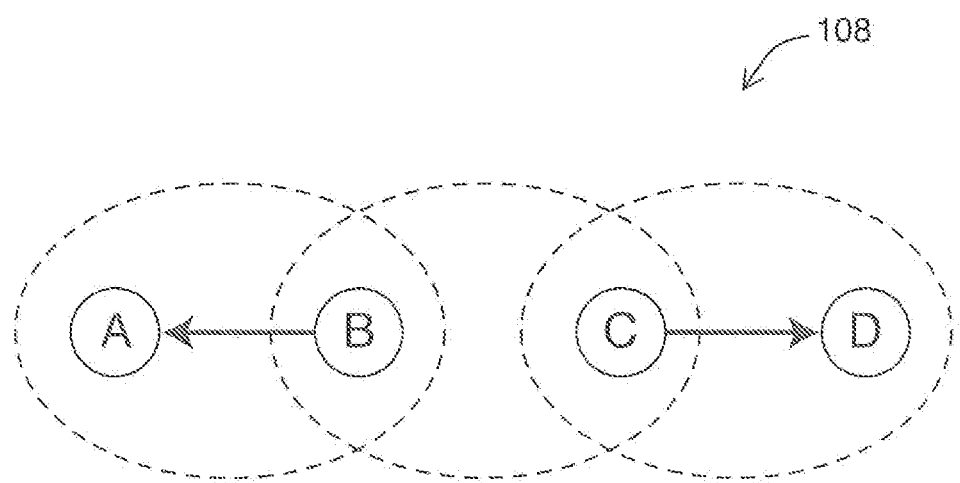

On the other hand, as illustrated in FIG. 1D, the exposed terminal problem is the situation where a node 104 is falsely prevented from transmitting to other nodes due to a transmission from a neighbor node to an out of range node. Here, node B is in the process of transmitting to node A causing node C to falsely conclude that it may not transmit to node D, whereas such a transmission from node C to node D will not interfere with the reception at node A. Further complications may arise in a RF communication because of mobile nodes in a network and use of low power transmitters.

Various embodiments described herein relate to devices that communicate over a wireless network. Here, nodes 104 enter into contention for bandwidth on one or more common communication channels.

In various embodiments, reduced collision, low duty cycle and minimized energy consumption may be achieved by synchronization of nodes 104. In some examples, scheduled data transmissions may be used to synchronize various nodes 104 in a network, where scheduled data may be any data used for the general operation of a network such as, for example, but not limited to, scheduling and routing data. In other examples, the node may be synchronized, at least in part by using a synchronization signal, referred to herein as a beacon. A combination of both the scheduled data and beacons may also be used to synchronize nodes. The scheduled data may be transmitted on a periodic basis according to an interval of time referred to as scheduled data transmission period.

A node can synchronize with the scheduled data of the neighbor node by knowing the time of one scheduled data transmission and the duration of one scheduled data transmission period. The process of synchronizing with the scheduled data of the neighbor is herein referred to as subscribing to a neighbor scheduled data. Nodes 104 may also transmit a beacon within a regular interval of time, referred to herein as a beacon period. Likewise, a node can synchronize to the beacon of a neighbor node by knowing the time at which one neighbor beacon is transmitted and the duration of the neighbor beacon period. In a network where all nodes transmit beacons at the same time, or nearly the same time, then a node may be synchronized to the entire network. The beacons may be typically transmitted on a common beacon channel.

Figure 2:
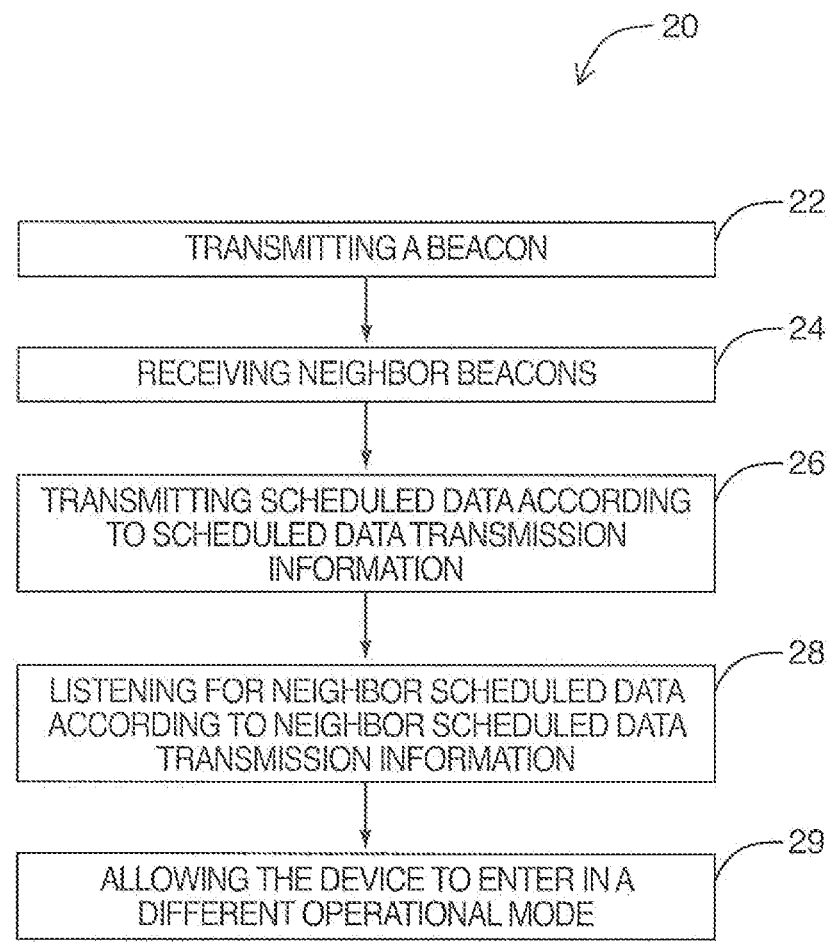
FIG. 2 is a flow chart illustrating the steps of the method for a device to communicate in one operational mode over a wireless network.

Now referring to FIG. 2, a flowchart is provided which illustrates the basic steps of a method 20 carried out by a node to communicate in one operational mode over a wireless network. At step (22), the node will transmit a beacon. This may be done according to any known media access control protocol. The beacon includes scheduled data transmission information which contains information regarding the time of the next scheduled data transmission. The beacon may be used by neighbor nodes receiving the beacon to synchronize with the beacon or to subscribe to the scheduled data of the node.

At step (24), the node receives neighbor beacons transmitted by neighbor nodes. This may also be done according to any known media access control protocol. Each neighbor beacon contains scheduled data transmission information announcing when the neighbor node transmitting the beacon will transmit scheduled data. The node may use received neighbor beacons to synchronize with the beacons of neighbor nodes or to subscribe to the scheduled data of the neighbor nodes. It will be understood that the transmission of a beacon and the receiving of neighbor beacons is performed using the same media access control protocol and may be performed in any order. Therefore the order of steps 22 and 24 is interchangeable.

At step (26), the node transmits scheduled data according to its scheduled data transmission information. Neighbor nodes that have subscribed to the node can receive scheduled data by turning on their receivers according to the scheduled data transmission information received in the beacon sent in step 22 or in a previous beacon period.

At step (28), the node listens for neighbor scheduled data transmitted according to the neighbor scheduled data transmission information contained in the neighbor beacon received at step (24) or in a previous beacon period. It will be understood that the ordering of steps 26 and 28 is interchangeable. Therefore, in some instances, a node may listen for neighbor scheduled data before transmitting scheduled data. It may further listen for additional neighbor scheduled data after transmitting scheduled data.

It will be appreciated that a node only needs to enter this operational mode to carry out any of the steps of this mode for short durations of time. Therefore, at step (29), the node enters in a different operational mode. In some embodiments, this other mode may be a low power or sleep mode in which the processor 110, along with the transmitter and receiver is shut down, thereby reducing energy consumption to a minimum. In other embodiments, the other mode can include an intensive computing mode in which processor 110 is devoted to computational tasks and may not need to utilize either the receiver or transmitter. It will be understood that the node may have yet other operating modes.

In various embodiments, the beacon period and the scheduled data transmission period are independent. The beacon period may have a duration that is different from that of the scheduled data transmission period. All nodes 104 may have a beacon period of equal duration. In some examples, all nodes may have the scheduled data transmission period of equal duration. In other examples, the duration of the scheduled data transmission period may slightly vary from one node 104 to another. This may be desired in order to prevent a situation where two or more nodes fall into lockstep and transmit scheduled data at the same time over and over. It should be understood that beacon period and scheduled data transmission period need not be aligned in any manner.

Figure 3:
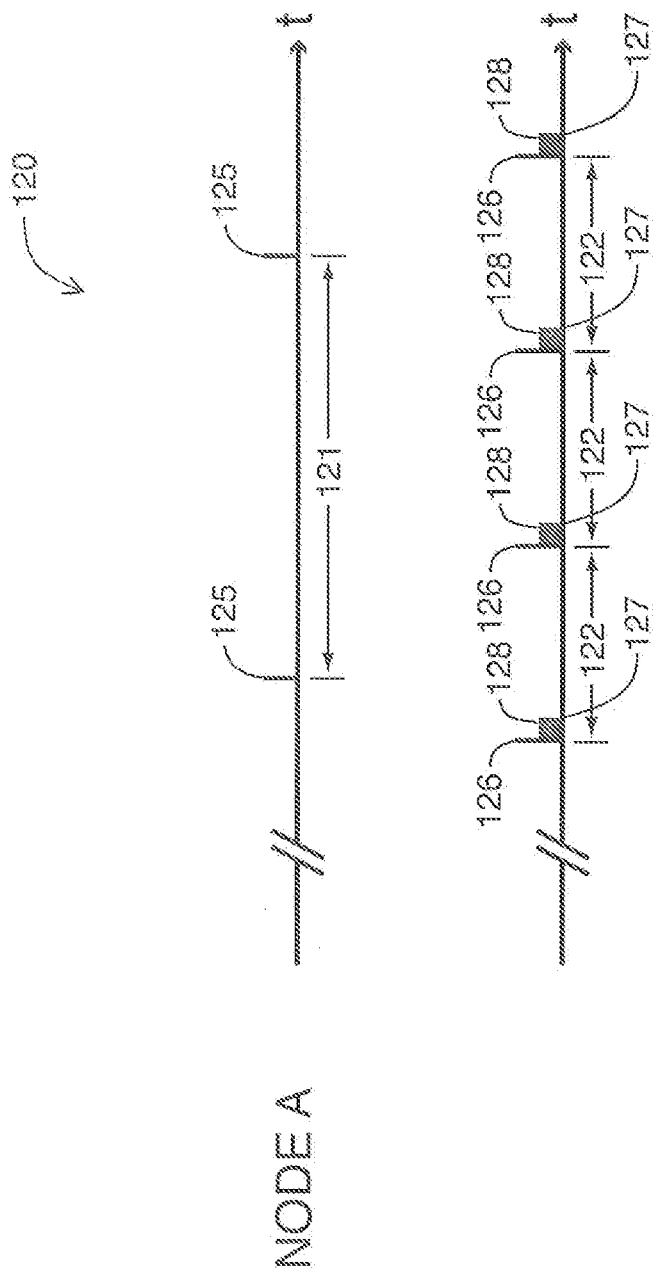
FIG. 3 is a diagram illustrating a beacon period and a scheduled data transmission period.

Referring to FIG. 3, therein illustrated is an example of a beacon period 121 and a scheduled data transmission period 122. In some embodiments, all nodes are pre-programmed to have the same beacon period 121 so that all nodes 104 send a beacon once every beacon period 121. In FIG. 3, element 125 denotes the start of the beacon period, referred to herein as beacon period start time and element 126 denotes the start of the scheduled data transmission period. Element 128 indicates the scheduled data.

Reference is now made to FIGS. 4A to 4D, which illustrate the information contained in a beacon according to various embodiments. In one embodiment, as illustrated in FIG. 4A, beacon 130 comprises scheduled data transmission information 132. Scheduled data transmission information 132 may include any suitable information that may be used by a node 104 receiving the beacon to synchronize with the scheduled data transmission period 122 of the node 104 that transmitted the beacon.

In one embodiment, scheduled data transmission information 132 comprises scheduled data time information, i.e. information regarding when next scheduled data 128 will be transmitted. In some other embodiments, scheduled data transmission information 132 comprises both scheduled data time information and information regarding scheduled data transmission period 122. A neighbor node receiving this beacon will have sufficient information to subscribe to the scheduled data of this node. In some other embodiments, scheduled data transmission information 132 comprises scheduled data time information and other information such as node ID, which may be defined as the address of the node transmitting the beacon. In some other embodiments, scheduled data transmission information 132 comprises scheduled data time information, scheduled data transmission period 122 and the node ID. It is understood that any scheduled data transmission information described herein relates to the scheduled data transmitted at a time after the time at which the beacon is transmitted.

In one embodiment, as mentioned above, only the scheduled data time information is included in the schedule data transmission information 132 of the beacon. This allows the data contained in the beacon to be short and allows reception of beacons to be more efficient. Other information, such as node ID and scheduled data transmission period 122, are included in the schedule data 128. In this case, a neighbor node must wait to receive scheduled data containing the scheduled data transmission period 122 before it can subscribe to the node transmitting the beacon.

In various embodiments, the scheduled data time information contained in scheduled data transmission information 132 may be given as a relative time, or as an absolute time. If relative time is given it may be in reference to the beacon period start time, the beacon period end time, or any other reference time that is known to, or can be deduced by the receiving node and transmitting node. Absolute time could be employed for example when a common time reference is available for transmitter and receiver, such as a GPS satellite time. Using relative time information could be an efficient way of keeping the time information short, while still having the temporal resolution required for synchronization. Relative time information will typically be more efficient when the duration of time between the beacon transmission and the scheduled data transmission is short, because the time data will be shorter when keeping the same resolution, and because the precision of synchronization will be less impaired in proportion to the duration of the interval because of the precision of a local time reference, such as a local real time clock.

In some embodiments, to minimize the number of collisions and to enhance robustness, the scheduled data transmissions from various nodes can be spread out over multiple frequency channels using spread spectrum. When spread spectrum is implemented, beacon 140, in addition to including scheduled data transmission information 132, also includes spread spectrum sequence synchronization information 141, which comprises information used by node 104 synchronize to a spread spectrum sequence employed by the nodes. In some embodiments, each node 104 may have a unique spread spectrum sequence. In some other embodiments, all nodes 104 use the same spread spectrum sequence. Such a beacon 140 is illustrated in FIG. 4B.

In various embodiments, spread spectrum sequence synchronization information 141 used for the scheduled data transmission may be announced in a variety of different ways. The spread spectrum sequence synchronization information 141 contained in a beacon may be a radio frequency at which the next scheduled data 128 will be transmitted.

In some embodiments, spread spectrum sequence synchronization information 141 may comprise information indicating at least one channel of a spread spectrum sequence.

In other embodiments, spread spectrum sequence synchronization information 141 may comprise information explicitly identifying at least one channel of the spread spectrum sequence.

In one embodiment, for instance, spread spectrum may be implemented using frequency-hopping, with the hops taking place each time scheduled data is transmitted. An example of frequency-hopping spread spectrum sequence for a node 104 may be [1, 4, 3, 12, 8, 2, 5], indicating the order of channels in which the scheduled data 128 transmission from the node may take place. By knowing at least one element of this sequence, the neighbor nodes 104 may lock on to the spread spectrum sequence of the node sending the spread spectrum sequence synchronization information 141.

The transmissions are made even more robust by having neighbor nodes know the entire spread spectrum sequence of a node. Even when scheduled data transmitted to neighbor nodes 104 is lost due to RF noise or collisions, neighbor nodes may still follow the spread spectrum sequence to receive subsequent scheduled data transmissions. Therefore, one failed transmission will not have the effect of causing neighbor nodes to miss subsequent scheduled data transmissions. Scheduled data 128 transmissions from nodes 104 are less likely to collide by using a spread spectrum technique, as the use of multiple frequencies will lessen the chance of collision of transmissions occurring at the same time. However, since a node 104 typically receives scheduled data 128 on only one channel at a time, the simultaneous temporal occurrence of two transmissions can be treated as a collision, because the receiver will have to pick one, and regard the other as lost.

Another embodiment is illustrated in FIG. 4C, where beacon 150 comprises beacon synchronization information 131, scheduled data transmission information 132 and spread spectrum sequence synchronization information 141. Beacon synchronization information 131 comprises any suitable information that may be used by a node 104 receiving the beacon or the scheduled data 128 to synchronize to the beacon period 121 of node 104 that transmitted the beacon.

In one embodiment, beacon synchronization information 131 may include information that may be used by a node 104 receiving the beacon or scheduled data 128 to determine the beacon period start time 125 of a node 104 transmitting the beacon. In some other embodiments, beacon synchronization information 131 comprises information that specifies the beacon period start time 125 of a node 104 transmitting the beacon.

In one embodiment, as illustrated in FIG. 4D, beacon 160 is 4 bytes long, wherein the beacon synchronization information 131 is 5 bits long, the scheduled data transmission information 132 is 24 bits long and the spread spectrum sequence synchronization information 141 is 3 bits long.

In various embodiments, beacons 130/140/150/160 are transmitted on one fixed channel. In some other embodiments, for instance, in an attempt to achieve immunity from interference, beacons 130/140/150/160 are transmitted on multiple channels. In some embodiments, beacons 130/140/150/160 are transmitted on multiple channels by selecting a new beacon channel for each new beacon period 121. In some other embodiments, beacons 130/140/150/160 are transmitted based on a sequence of channels that is known by nodes 104. In some embodiments, where beacons 130/140/150/160 are for example transmitted on multiple channels within the same beacon period 121, the transmission will either be simultaneous or sequential.

To further minimize the energy consumption and the number of collisions, in one embodiment, all the nodes in the network can synchronize their beacons, such that all beacons 130/140/150/160 are sent out during a small portion of beacon period 121, referred to herein as beacon interval 201. As illustrated in FIG. 5A, node A transmits a beacon 130/140/150/160 during a beacon interval 201 of the main beacon period 121.

Referring now to FIG. 5B which illustrates another embodiment where beacon interval 201 is divided into a plurality of beacon slots 211 so that each node 104 sends a beacon 130/140/150/160 in one of the plurality of slots. Each node randomly selects a beacon slot within the beacon interval in which to send its beacon. In this case, beacon synchronization information 131 may comprise the slot number selected by the node to send a beacon. This embodiment closely resembles slotted aloha known in the art. It will be understood that a collision will occur if two or more neighbor nodes happen to select the same beacon slot in which to transmit their respective beacons. Therefore, the number of beacon slots 211 is appropriately selected according to the expected number of neighbor nodes that can be within range of each other and that may transmit beacons within the beacon interval such that the probability of collision is acceptably low.

In other embodiments, any other known media access control protocol may be applied for transmitting beacons within the beacon interval.

Figure 6:
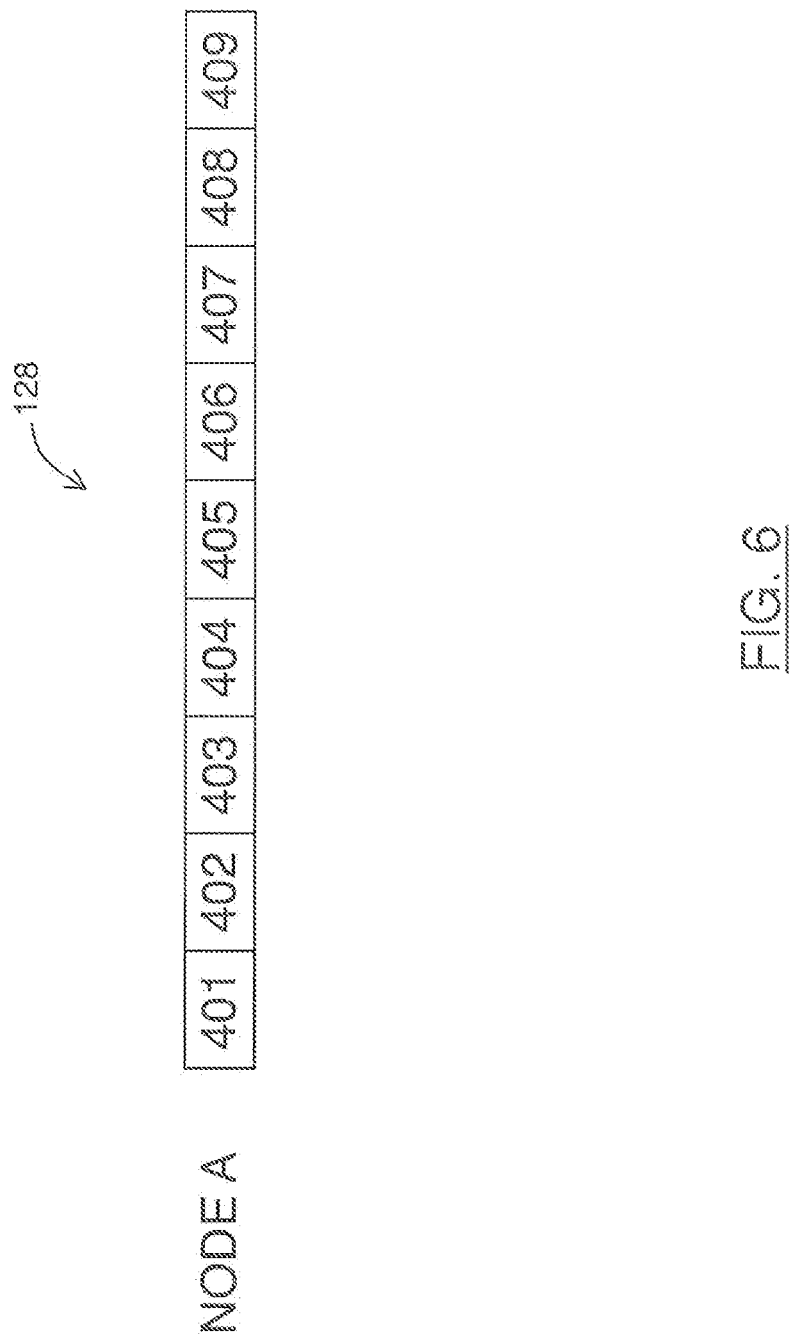
FIG. 6 illustrates a sample of scheduled data.

FIG. 6 illustrates a type of a scheduled data 128 according to an embodiment. Scheduled data 128 may comprise an address 401 of the device transmitting, the scheduled data information 402, that can be used to determine the scheduled data transmission period 122 used by the device, an interleave factor 403, as discussed below, a beacon time 404, referring to information indicating the time from the start of the scheduled data 128 to the start of the beacon period 125, or any other data allowing the receiver to know when the transmitters beacon period starts, a neighbor count 405 of the device, referring to the number of neighbors for the device transmitting scheduled data. As an illustration only, an address 408, and data 409, is included here for sending data to a neighbor. Address 408 and data 409 is used only by the neighbor node having the address 408, and is ignored by all other neighbor nodes. Other kinds of data may also be included. This data 409 may be any kind of application data or other operational data that is unrelated to the operational mode where the node communicates with other nodes in the network. In some instances, data may be received by some or all of the neighbor nodes.

Figure 7:
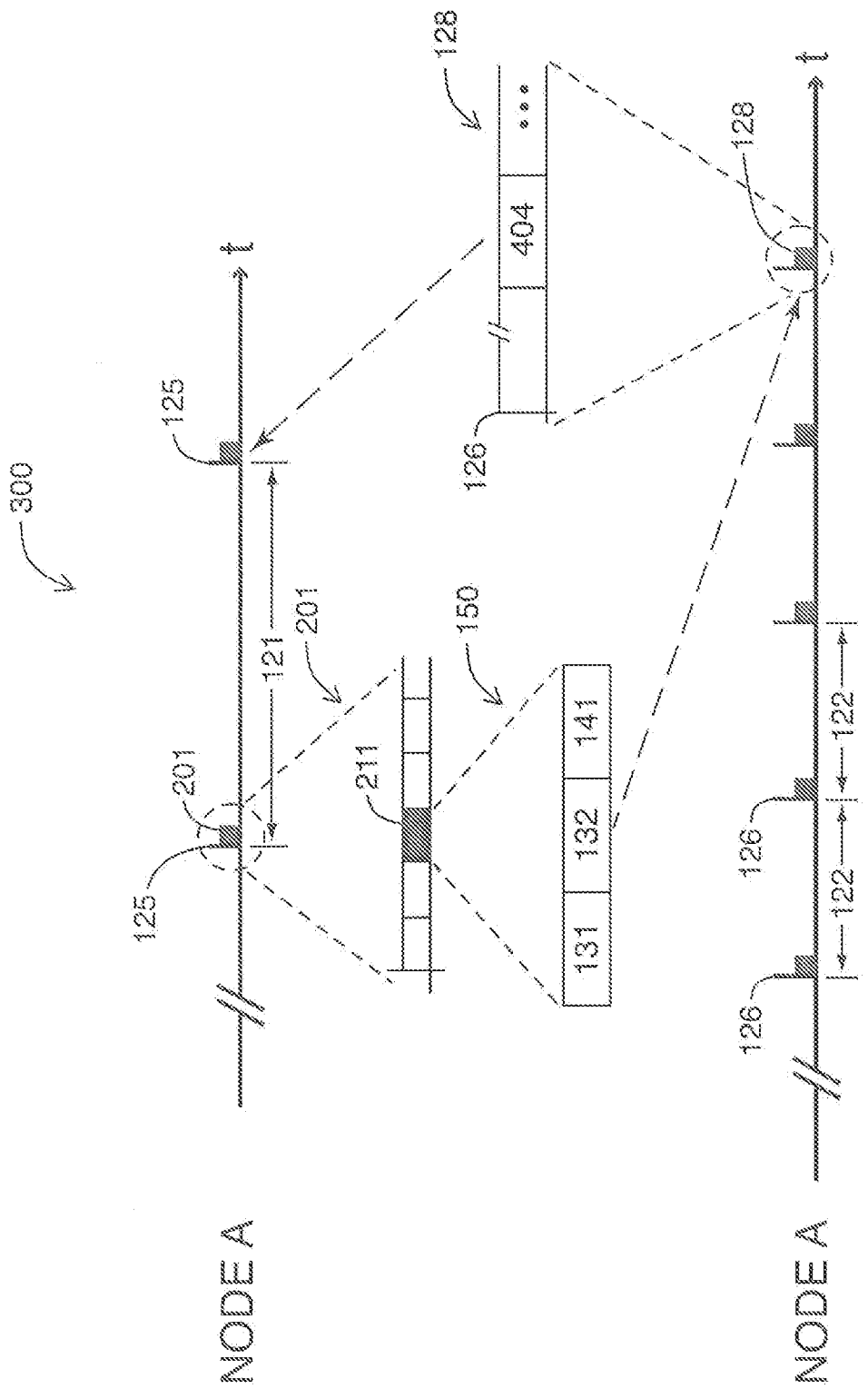
FIG. 7 illustrates an example of the process of synchronization to the beacon and subscribing to scheduled data.

Reference is now made to FIG. 7, which illustrates the process of synchronization to the beacon and subscribing to the scheduled data. Node A transmits a beacon containing scheduled data transmission information 132. In this example, node A is sending the beacon within a beacon interval 201. As shown in FIG. 7, in this particular embodiment, the beacon interval is divided into a plurality of beacon slots 211. A neighbor listening for beacons during the beacon interval may receive the beacon. The neighbor node uses scheduled data transmission information 132 contained in the received beacon to determine the start time 126 of the next scheduled data 128 from node A. By knowing the start time 126 of the next scheduled data 128 and the duration of the scheduled data transmission period 122, the neighbor node can subscribe to the scheduled data of node A. Note that in some embodiments, the scheduled data transmission period 122 is included in the beacon, while in some other embodiments this information is contained in the scheduled data.

If the media access control method employed is of such a nature that the beacon period start time 125 cannot be detected from reception of the beacon alone, then in some instances beacon synchronization information 131 is included in the beacon in order to allow for synchronization. This is the case in this example, where a variant of slotted aloha is used as the media access control method. In other cases the media access control method employed is still of a nature that the beacon period start time 125 cannot be detected from reception of the beacon alone but the beacon synchronization information 131 is not included in the beacon. In these cases a node determines the beacon period start time 125 for node A from the beacon time contained in the scheduled data. In various embodiments, the beacon time 404 contained in the scheduled data 128 is the duration of time between the start of the scheduled data 128 and the next beacon period start time 125. The beacon time 404 may also be the duration of time between any of the elements in the scheduled data 128 and the next beacon period start time 125. Like scheduled data transmission information 132, the beacon time 404 may also be relative or absolute and can be any value which identifies or enables the computation of the beacon period start time 125.

When the nodes commence communication after a long period of inactivity, such as, for example, the first time all nodes are turned on in an arrangement, the nodes will not be synchronized to the beacon or to the scheduled data of their respective neighbor nodes. In one embodiment, all unsynchronized nodes transmit beacons in order to begin synchronization. This process may be applied, for example, at power-up of the network after a long period of inactivity. The time at which a node 104 transmits a first beacon is the beacon period start time 125 of that node. Nodes are preconfigured to have the same beacon period 121.

It will be appreciated that the number of nodes within range of one another may be much higher at power-up of the network than during normal operation. For example, devices may be turned on in close proximity, such as within a same room, before being separately installed in the field, such as throughout a building or in various places of a forest. If, for example, some mechanism is employed that allows the nodes to turn on at the same time, it may be problematic to have all nodes attempt to initially access the media at the same time. For example, this would be a problem where slotted aloha is being used to resolve contention for beacon transmissions. If all nodes were thus turned on at the same time then beacon transmissions from the nodes would all have to contend for the media during the beacon interval. Depending on the media access control protocol employed, this unusually high contention ratio, which can be much higher than the maximum contention seen in the field, could be problematic and may require special measures to alleviate it.

Therefore, in one embodiment, it is desirable that each node has a beacon period start time 125 at power-up that is sufficiently different from the beacon period start time of any other node. In one embodiment, in order for nodes 104 to have different beacon period start times, the beacon period start time 125 for each node is randomly selected. It will be appreciated that this process of transmitting beacons from many nodes closely imitates Pure ALOHA known in the art. In another embodiment, the beacon period start time is chosen according to a unique characteristic of the node, such as node ID. By spreading the beacon period start times 125 of the nodes being initialized at a network power-up over a longer duration of time, collisions between nodes transmitting beacons can be effectively reduced.

As previously discussed, when a node 104 is not transmitting, the node 104 turns on its receiver to scan for beacons transmitted from other neighbor nodes in order to synchronize with other neighbor nodes. The process of scanning the beacon channel to detect beacons sent from neighbor nodes is herein referred to as a beacon scan. When the nodes 104 are not synchronized, the nodes 104 each perform a beacon scan for a duration equal to the duration of a full beacon period 121 at power-up. This full beacon scan allows each node to detect neighbor nodes in the network.

Likewise, the time at which any node 104 first sends scheduled data 128 should be different from that of all other nodes to avoid the same problem of high probability of collisions. That is, any node should have a scheduled data transmission period start time 126 that is different from that of all other nodes. In one embodiment, to allow nodes to have different scheduled data transmission period start times, the start time is randomly selected for each node. In another embodiment, the time of the first scheduled data transmission from a node is computed using some unique characteristic of the node 104, such as node ID.

In addition to the selection of a scheduled data transmission period start time 126, the duration of the scheduled data transmission period 122 is also selected. For any node, the duration of the scheduled data transmission period 122 should be slightly different from the duration of the scheduled data transmission periods 122 of any other nodes and also different from the duration of the beacon period 121 of the same node. In one embodiment, the duration of the scheduled data transmission period 122 is selected randomly. In another embodiment, the duration of the scheduled data transmission period 122 is computed using some unique characteristic of the node 104, such as node ID. However, the embodiment where the duration of the scheduled data transmission period 122 is selected randomly from a fixed range of duration of periods is preferred because computing a duration of the scheduled data transmission period 122 using the node ID may result in too big a spread between the minimum and maximum durations of periods for nodes, as any two periods need to differ by at least twice the duration of a scheduled data transmission to avoid having scheduled data transmission from two neighbor nodes collide in two or more consecutive periods. Although randomly selecting the duration of the scheduled data transmission period 122 may also cause nodes to have scheduled data transmission periods of similar durations, the probability of this occurring remains sufficiently low.

By having scheduled data transmission periods 122 of different durations, collisions between two neighbor nodes occur with a lower probability. Whereas, if the durations of the scheduled data transmission periods 122 and the scheduled data transmission period start times 126 are the same, or nearly the same, for both neighbor nodes, scheduled data transmissions from two neighbor nodes will fall into lockstep and repeatedly collide at each period. By randomly selecting both the scheduled data transmission period start time 126 and the duration of the scheduled data transmission period 122, the probability of two nodes falling into lockstep is sufficiently low. For any two nodes having different period start times 126, and different durations of scheduled data transmission periods 122, where the periods differs by at least twice the duration of a scheduled data transmission, a collision will only occur at every interval equal to the lowest common multiple of the durations of the scheduled data transmission periods of the two nodes. Therefore, although collisions are occurring, they occur so rarely that they can be ignored. For example, given a duration of a scheduled data transmission that takes less than 500 μs, if one node has a scheduled data transmission period with a duration of 2.999 s and another node has a scheduled data transmission period with a duration of 3.000 s, then a collision between the two nodes will only occur approximately every 9000 seconds.

Even when the beacon period start times 125 and scheduled data transmission periods are randomly selected, there remains a possibility that two or more nodes may select start times that are close together such that a collision will occur. Therefore, in one embodiment, the beacon period and the scheduled data transmission period is selected to be much greater than the time required for one beacon transmission or one transmission of scheduled data such that the probability of randomly selecting beacon period start times or scheduled data transmission start times that will cause a collision is sufficiently low.

When the duration of the scheduled data transmission period 122 and the duration of the beacon period 121 of a node are sufficiently different, and their respective periods are not multiples of each other, this will ensure that scheduled data and beacon will only rarely be transmitted at the same time. If the scheduled data transmission start time 126 and the beacon start time 125 happen to coincide, then a node must choose between transmitting scheduled data or a beacon since it only has one transmitter. This is true even if scheduled data and beacons are transmitted on different channels if a single transmitter is used. By choosing a scheduled data transmission period 122 that is different from the beacon period 121 for a particular node, such a conflict will occur only at every interval equal to the lowest common multiple of the durations of the transmission periods.

A full beacon scan should provide a high probability for a node to receive beacons transmitted from at least some of its neighbor nodes. Beacons may be lost due to collisions and effects that normally impair transmissions on the chosen medium. For instance, in the case where the medium is RF, weak signals, multipath fading and RF noise are common causes of lost transmissions. However, in order to synchronize with the network, at least one beacon must be received. Therefore a node that does not receive beacons from its neighbor node in a full beacon scan must continue to listen for beacons until at least one beacon is received.

In some cases, a node may not receive any neighbor beacons even after scanning for a long time. This may occur if neighbor nodes are taking a long time to enter into a mode where beacons are transmitted. Therefore, in some embodiments, a node that does not receive any neighbor beacons after scanning for a long time enters into the low power mode to save power. It may then alternate between the scanning mode and the low power mode until it successfully receives a neighbor beacon.

While some embodiments may employ a traditional Pure ALOHA, or even other more efficient MAC schemes, it will be appreciated that the time required to initially synchronize is not critical. Even not receiving beacons from all neighbor nodes in a full beacon scan is not problematic because a node can always synchronize and subscribe to the scheduled data of its neighbor nodes at a later time.

After power-up of a network, synchronized nodes of the network continue to transmit beacons at a same periodic interval. The duration of this periodic interval is equal to the beacon period 121. These additional beacons are used to further allow new nodes that are initialized in the network to subscribe to the scheduled data of their respective neighbor nodes. Beacons are also used by newly initialized nodes to synchronize to the beacon of its neighbor nodes or the entire network. In the case where beacon synchronization information 131 is contained in the scheduled data, newly initialized nodes must wait to receive scheduled data before being able to synchronize to the beacon. These additional beacons further allow mobile nodes to subscribe to neighbor scheduled data when moving through the network.

Referring back to FIG. 7, it will be understood that, at initialization, when nodes select their respective beacon period start times 125 randomly, or by other means as described previously, the nodes beacon start times will occur at different times during an interval of time equal in duration to a single beacon period 121. In all embodiments, the beacon period start times 125 of the nodes of the network are then synchronized so that the start times are at the same, or nearly the same, as shown in FIG. 7. Consequently, the nodes of the network will be able to transmit their beacons within the beacon interval 201. Since beacons and scheduled data are sent at different fixed periods, independent of one another, any node can change its beacon period start time 125. All nodes still maintain the same beacon period 121.

When a node receives beacon synchronization information 131 in scheduled data 128 from another node, the receiving node 104 determines whether or not to change its beacon period start time 125 to align with the other node's beacon period start time 125. Changing beacon period start times is necessary if the beacon period start times of the two nodes are not concurrent. It will be understood that whether two start times are deemed concurrent depends on factors such as the precision with which beacon period start times can be practically aligned. The receiving node ascertains the difference between its own beacon start time and that of the other node, by comparing the time to its own beacon with the time to the other nodes beacon which is computed or deduced from the beacon synchronization information 131, contained in the scheduled data transmitted by the other node. Whether or not the receiving node 104 changes its beacon period start time 125 may be decided by a criteria such as which beacon period start time 125 occurs later in time.

Since beacons are cyclic, which node's beacon period start time 125 occurs later may be defined as follows: if a first node 104 receiving the scheduled data 128 from a second node 104 determines that the duration of time from its own beacon period start time 125 to the second node's beacon period start time 125 is less than half the beacon period 121, the second node is the one with the later beacon period start time 125. The first node 104 with the earlier beacon period start time 125 can then be defined as the node that must change its beacon period start time 125 to align with the second node's beacon period start time 125.

A node that has changed its beacon period start time 125 must accordingly correct its beacon time 404. Any neighbor node that receives scheduled data containing this beacon time 404 will know the change in the beacon period start time 125 of the first node.

Having all the beacon period start times 125 of all nodes of a network aligned to the same time, or nearly the same time and then transmitting all the beacons during the beacon interval is particularly advantageous in a network where nodes are mobile because it keeps the duration of a beacon scan as short as possible and allows nodes to spend a maximum of time in another operating mode, such as the low power mode. As a mobile node physically moves through a network, it will come within range of some nodes while moving out of range of others. If a mobile node has synchronized to the beacon of its neighbor node in a network where beacon period start times are aligned, then it can maintain synchronization with the beacons of the network even as it moves out of range of some neighbor nodes and into the range of new neighbor nodes because these new neighbor nodes will practically have the same beacon period start times 125.

Therefore, by being able to maintain synchronization within the network, a mobile node only needs to subscribe to the scheduled data timing of its new neighbors. A mobile node scans for beacons from its new neighbors and subscribes to the scheduled data timing of these new neighbors using the scheduled data transmission information 132 contained in the beacons. Since for all nodes of the network, the beacon period start times are aligned and beacons are transmitted during a beacon interval, a mobile node only needs to scan for that short duration of time to receive beacons from many of its new neighbors. Therefore, a significant saving in power may be achieved by having to scan for beacons during only the beacon interval and allowing the node to enter into a low power mode at other times versus having to scan for a substantial duration of the beacon period 121 in a network where the beacon period start times 126 are not the same, or nearly the same.

In an established network where the nodes have already been synchronized, new nodes being added to a network must be initialized. For instance, in an arrangement where nodes 104 are deployed as components in a building automation system, new nodes 104 may be installed if the building is expanded or renovated. A newly initialized node is configured to have a beacon period 121 of a same duration as that of the network. In some embodiments, a newly initialized node performs a beacon scan to detect beacons from its neighbor nodes.

In a beacon scan, the newly initialized node listens for at least a portion of the beacon period 121 for beacons from neighbor nodes. In some embodiments, the beacon scan can last the entire beacon period 121. This scan should allow the newly initialized node to receive beacons transmitted from some of its neighbor nodes. In some cases, it may not receive beacons from all neighbors, even when scanning for the entire beacon period because beacons may be lost due to collision, RF noise, or other effects. Furthermore, in some embodiments, a node may not transmit a beacon in every beacon period, as nodes, according to one embodiment, may choose not to send beacons unless the time from the beacon transmission to the scheduled data transmission is shorter than some predetermined interval. For nodes using interleave, this approach has the added benefit of lowering contention in the beacon channel when the neighbor density is high.

In other embodiments, the beacon scan may last a duration of time longer than the entire beacon period 121. This may be desirable in order to receive beacons that are lost or not present in first beacon period. In yet other embodiments, a beacon scan may have a duration that is shorter than the entire beacon period 121. Importantly, a node must receive at least one beacon within the beacon scan in order to be able to synchronize with its neighbor nodes. Therefore, in one embodiment, a node may be configured to perform a beacon scan continuously until one beacon is received from a neighbor node. Typically this scan will last less than an entire beacon period 121 but may be longer if all the beacons transmitted from the neighbor node in the first beacon period are lost.

In one embodiment, in a network in which the nodes have already aligned their beacon period start times 125 to be the same, or nearly the same, a newly initialized node selects a beacon period start time to be the same as this start time. The newly initialized node then transmits beacons during the beacon interval within each beacon period 121. Beacons transmitted by this node can be received by neighbor nodes that scan for beacons during the beacon interval. In another embodiment, the newly initialized node randomly selects a beacon period start time and may change its beacon period start time subsequently to align with the start times of other nodes by applying the criteria given previously for determining when to change the beacon start time. However, it will be appreciated that where beacon period start times of the nodes are being changed to be the same, or nearly the same, the selection of beacon period start time made by this one node may cause all other nodes of the network to change their beacon period start time.

The duration of the beacon scan will depend on the desired performance versus the desired power conservation. A longer duration will permit more beacons to be received and therefore permit synchronization with more neighbor node sooner. However, this longer duration will also use up more power. When a shorter duration is used, fewer beacons from neighboring nodes are received. In this case, synchronization with all neighboring nodes will only be achieved at a later time.

If a node 104 has a lot of neighbors at one time, for example where many mobile nodes move within its range at the same, the node 104 may consume a lot of energy as it may have to switch its receiver on numerous times in order to receive the subscribed scheduled data 128 from the neighbors. That is, the node spends less time in a different operational mode, such as the low power or sleep mode. It will be understood that even if a node may have the capacity to receive a certain amount of data during one scheduled data transmission period, it may want to limit the amount of data it receives to below this maximum capacity in order to conserve energy. This is especially important for nodes that are battery powered and that must stay operational for a set amount of time. Therefore, when the number of neighbor nodes of a node reaches a certain limit, this node may request its neighbor nodes to employ a technique to be described in this disclosure as interleave. A node that has reached, or exceeded this limit is herein referred as being overloaded. It will be understood that this limit may be lower than the maximum capacity for a node. As a node becomes more overloaded, in that it has even more neighbor nodes than the overload limit, the node may request its neighbors to employ a higher degree of interleave, as discussed below.

When operating, each node 104 provides to its neighbor nodes 104 information indicating its neighbor density, which is referred to herein as neighbor density information. In some embodiments, the neighbor density information comprises a neighbor count, i.e. the number of neighbors a node has. Each node 104 may announce its neighbor density as part of its scheduled data 128.

In various embodiments, each neighbor node 104, upon receiving the neighbor density information from a first node 104, determines if the first node 104 is being overloaded. Whether this first node 104 is being overloaded may be determined by comparing the neighbor density information of the first node 104 against a predetermined count, which indicates the maximum number of allowable neighbors before interleave is used. It will be understood that a neighbor node will receive neighbor density information from this first node and from all other nodes with which it is a neighbor. In one embodiment, the neighbor node determines the highest neighbor density, for example the highest neighbor count, from all of the neighbor density information received and applies interleave according to this highest neighbor density.

A neighbor node applying interleave adjusts its scheduled data transmission period 122. The adjustment criteria may be predetermined and may comprise increasing or decreasing data transmission period 122 by a factor referred to herein as an interleave factor. The interleave factor applied varies according to changes in the neighbor density received by the neighbor node. As the neighbor density received increases or decreases, the neighbor node may enter into various degrees of interleave or cease applying interleave It will be appreciated that if all the neighbor nodes increase their respective scheduled data transmission periods 122 according to the neighbor density information provided by a first node, then the first node will receive less scheduled data in a given amount of time. Therefore, the first node can conserve more energy by being able to enter into a low-power mode when it is not receiving scheduled data for a longer duration of time. By appropriately adjusting the scheduled data transmission periods 122 of all neighbor nodes according to the neighbor density information, the average power consumption of the first node may be kept within certain predetermined limits. It will be appreciated that in the case of a battery-powered node, keeping power consumption within these limits will ensure that the node attains the operating life set for it.

In a network consisting of many mobile nodes, the number of neighbor nodes any node may have, and therefore the neighbor density, may change dynamically. Therefore any node must also be adapted to change its interleave factor dynamically to reflect the changes in neighbor density.

However, the inventor also recognizes that increasing or decreasing the scheduled data transmission period 122 rapidly can pose problems, for example there may be a risk that some receivers will fail to stay synchronized if just one scheduled data transmission is lost. As a consequence, in some embodiments, the interleave factor used is $2^n$, where n is referred to as the interleave number and is a natural number. The interleave factor determines how often the node 104 applying the interleave factor transmits its scheduled data 128 relative to its scheduled data transmission period 122. For example, an interleave factor of 2 indicates that scheduled data 128 is transmitted once every two scheduled data transmission periods 122.

TABLE 1

Interleave example

| NC | Interleave factor used by neighbours | Number of times to send beacon in P' | Avg. number of times to activate receiver in P' | Avg. number of on-off cycles for transceiver in P' |
|---|---|---|---|---|
| 1 | 1 | 1 | 1.000 | 2.000 |
| 2 | 1 | 1 | 2.000 | 3.000 |
| 3 | 2 | 1 | 1.500 | 2.500 |

TABLE 1-continued

Interleave example

| NC | Interleave factor used by neighbours | Number of times to send beacon in P' | Avg. number of times to activate receiver in P' | Avg. number of on-off cycles for transceiver in P' |
|---|---|---|---|---|
| 4 | 2 | 1 | 2.000 | 3.000 |
| 5 | 4 | 1 | 1.250 | 2.250 |
| 6 | 4 | 1 | 1.500 | 2.500 |
| 7 | 4 | 1 | 1.750 | 2.750 |
| 8 | 4 | 1 | 2.000 | 3.000 |
| 9 | 8 | 1 | 1.125 | 2.125 |
| 10 | 8 | 1 | 1.250 | 2.250 |
| 11 | 8 | 1 | 1.375 | 2.375 |
| 12 | 8 | 1 | 1.500 | 2.500 |
| 13 | 8 | 1 | 1.625 | 2.625 |
| 14 | 8 | 1 | 1.750 | 2.750 |
| 15 | 8 | 1 | 1.875 | 2.875 |
| 16 | 8 | 1 | 2.000 | 3.000 |

Reference is now made to Table 1 above, which illustrates an example of the use of interleave. The interleave factor used by neighbor nodes 104 here is a function of neighbor count. Table 1 is designed on the principle that the workload of receiving scheduled data for a node 104 subscribing to any number of neighbor nodes 104 will never impose a energy requirement or 'workload' that exceeds the 'workload' required to follow the schedules of 2 nodes. In this example, each neighbor node has a scheduled data transmission period of P' for its scheduled data 128. Based on the neighbor density information from a first node, each neighbor node 104 will adjust its scheduled data transmission period 122 so that the period P' will change to 2P' to 4P' etc. This table illustrates that with only 4 interleave steps, a total of 16 neighbors can be accommodated with no more power consumption than for 2 neighbors.

In some embodiments, a node may announce its interleave factor, in the scheduled data. Each neighbor node that receives this interleave factor and that is already subscribed to the scheduled data of this node will know how often to turn on its receiver to receive subsequent scheduled data transmissions from this node.

By limiting the rate at which the degree of the applied interleave is changed, the probability that a neighbor node will lose track of the interleave being applied due to not receiving scheduled data is kept low. A neighbor node that does not receive scheduled data announcing a change of interleave can learn of the change when it receives a subsequent scheduled data transmission. However, if the interleave being applied by a node changes too often within a short duration of time then a neighbor node may lose track of the interleave being applied at the node.

A large increase in the interleave factor applied at a node may be problematic because a neighbor node that does not receive a scheduled data transmission announcing the change, will now listen for scheduled data transmissions from the first node more often that the first node actually sends scheduled data. For example, after increasing its interleave from 1 to 4, a node will only transmit scheduled data at every fourth scheduled data transmission period, rather than at every single period. However, a neighbor node that does not receive a scheduled data transmission announcing the change of interleave will still listen for schedule data from the first node at every single period. The neighbor node may learn of the change in interleave the next time it successfully receives a scheduled data transmission from the first node.

However, if the neighbor node is configured such that it determines the first node to have turned off or moved out of range, when it does not receive a certain consecutive number of scheduled data transmissions from the first node, then the neighbor node may cease listening for scheduled data transmissions entirely before the first node even sends another scheduled data transmission. In this example, if the neighbor node determines the first node to be lost after listening for, but not receiving, scheduled data transmissions from this first node in, for example, three consecutive scheduled data transmissions and ceases to listen for any more scheduled data from this first node, then the neighbor node will miss the scheduled data transmission from the first node in the fourth period. This neighbor node will only subscribe to the first node again when it receives a beacon from this first node in a beacon scan at a later time.

A large decrease in the interleave factor applied at a node may also be problematic because a neighbor node that does not receive a scheduled data transmission announcing the change will miss several other scheduled data transmissions before turning on its receiver again to listen for more scheduled data. For example, after decreasing its interleave from 8 to 2, a node will transmit scheduled data at every second scheduled data transmission period rather than at every eighth period. However, a neighbor node that does not receive a scheduled data transmission announcing the change of interleave will still only be listening for scheduled data transmissions at every eighth period. Therefore, the neighbor node will miss three scheduled data transmissions from the first node before listening for another scheduled data transmission. If the first node changes its interleave again within any period in which the neighbor node is not listening for scheduled data, this second change will cause the neighbor node to lose track of the transmissions, and thus the interleave.

Therefore in one embodiment, a node is configured such that in any change of interleave, the interleave number may only increase or decrease by 1. That is, in any change of interleave, the new interleave factor may only be twice the value of, or half the value of, the previous interleave factor. When this constraint is imposed for an increase in the interleave applied at a node, a neighbor node that does not receive a scheduled data announcing the increase will turn on to listen for scheduled data as usual, but now the first node transmits scheduled data only every second time the receiver listens. Therefore, the neighbor node will only turn on once to listen to scheduled data in between the periods at which the first node transmits scheduled data.

Likewise, when this constraint is imposed through a decrease in the interleave applied to a node, a neighbor node that does not receive scheduled data announcing the decrease will turn on to listen for scheduled data as usual, but now the first node transmits data twice as often as the receiver turns on to listen for the data. Therefore, the neighbor node will miss only one scheduled data transmission from the first node in between the times it listens for transmissions from this first node. Furthermore, a node is configured such that, after announcing a decrease in the interleave factor by half, it can only change the interleave being applied again at every second scheduled data transmission. By allowing the first node to only change its interleave again at every second scheduled data transmission, this node always announces this second change in scheduled data transmissions that the neighbor node is listening for.

Figure 8:
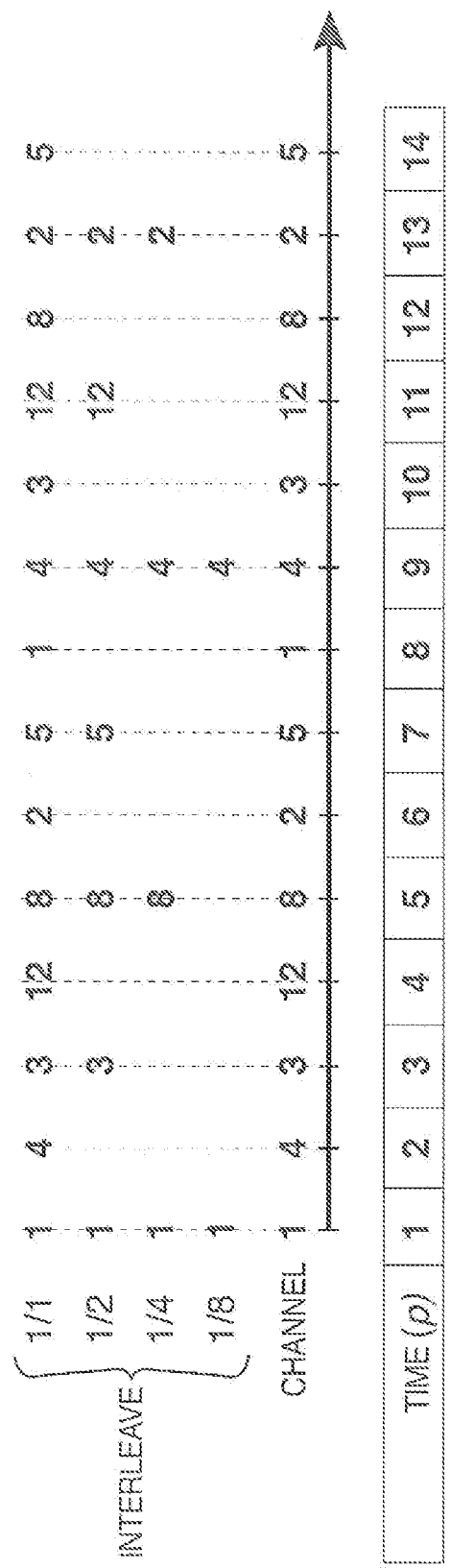
FIG. 8 illustrates an example of transmissions by a node applying various degrees of interleave using a spread spectrum technique.

Reference is now made to FIG. 8, illustrating transmissions by a node applying various degrees of interleave while also spreading out the transmission over multiple frequencies using spread spectrum described above. If, for example, the node changes its interleave factor from 4 to 2 at time 1p, it will now be transmitting scheduled data at times 3p, 5p, 7p, 9p, and so on. However, a neighbor node that misses the scheduled data transmission at time 1p announcing the change in interleave at the first node will only listen for scheduled data from that node again at time 5p, 9p and 13p. By imposing the restriction that the first node can only change its interleave at every second scheduled data transmission (in this case, times 5p, 9p and 13p), this node is changing its interleave and announcing the change in scheduled data transmissions that may be received by a neighbor node. This prevents a change of interleave that cannot be received by the neighbor node, which would in turn cause the neighbor node to lose track of the interleave being applied at the first node.

A neighbor node that does not receive more than one consecutive scheduled data transmission from a first node announcing a change of interleave may still have a significant chance of losing track of the interleave being applied at the first node. For example, when a first node increments its interleave factor from 1 to 2 in one scheduled data transmission and then from 2 to 4 in the next scheduled data transmission, a neighbor node that does not receive both scheduled data transmissions announcing the changes will be subject to the same issues as when the first node changes its interleave directly from 1 to 4. Similarly, when the first node decreases its interleave and then increases the interleave again during two consecutive transmissions, a neighbor node that misses just the first scheduled data transmissions announcing the decrease will lose track of the interleave being applied at the first node.

Therefore in some embodiments, a node is configured such that it can only change the interleave being applied every fixed number of scheduled data transmissions. This number of scheduled data transmissions is determined according to an acceptable probability that a neighbor node will successfully receive at least one transmission within this number of scheduled data transmissions. For example, if a neighbor has a probability of 0.7 of successfully receiving a scheduled data transmission, the failure rate of a single transmission would be 0.3. The failure to receive could be due to noise in the RF channel, or other effects, as previously described. Given three chances to receive, it is possible to calculate the probability, $p=0.3^3=0.973$, that the receiver successfully received at least one of the transmissions. In this case, a node that changes its interleave from for example 2 to 4, must wait three scheduled data transmissions, or 12 scheduled data transmission periods 122, before it changes its interleave again. In this way, a neighbor node that does not receive an announcement of a change in the interleave due to not receiving schedule data, can know of the change by receiving more scheduled data with an acceptable probability of success before the first node changes its interleave again.

In other embodiments where more than one channel is being used to implement frequency hopping spread spectrum, the number of channels used in the frequency hopping sequence may be configured to be one less than a multiple of the maximum interleave that can be applied at any node. This ensures that even when the maximum interleave is being applied, all channels of the spread spectrum is still being used. If a lesser number of channels are desired, then the number of channels in the sequence can alternatively be configured to be one less than any of the interleave factors used. Referring back to FIG. 8, where the maximum interleave being applied is 8, the node uses seven channels to implement frequency hopping spread spectrum.

In one embodiment, a node performs a frequency hop at each scheduled data transmission period even when it does not transmit in that period due to interleave being applied. In this way, neighbor nodes that know the spread spectrum sequence of the first node and that are also performing a frequency hop at each transmission period, can recover from not receiving a scheduled data transmission announcing a change in interleave.

Referring back to FIG. 8, in which, for example, a node changes its interleave at time 1p from 4 to 2. A neighbor node that does receive scheduled data announcing this change of interleave will only turn on its receiver again at time 5p to listen to scheduled data from the first node. Since both the first node and the neighbor node perform a frequency hop at every single scheduled data transmission period and follow the same spread spectrum, then at time 5p both the first node and the neighbor node will be transmitting and receiving scheduled data over the same channel '8'. Therefore, despite missing a scheduled data transmission at 3p, the neighbor node has received scheduled data over the correct channel and has now learned the interleave being applied at the first node.

Figure 9:
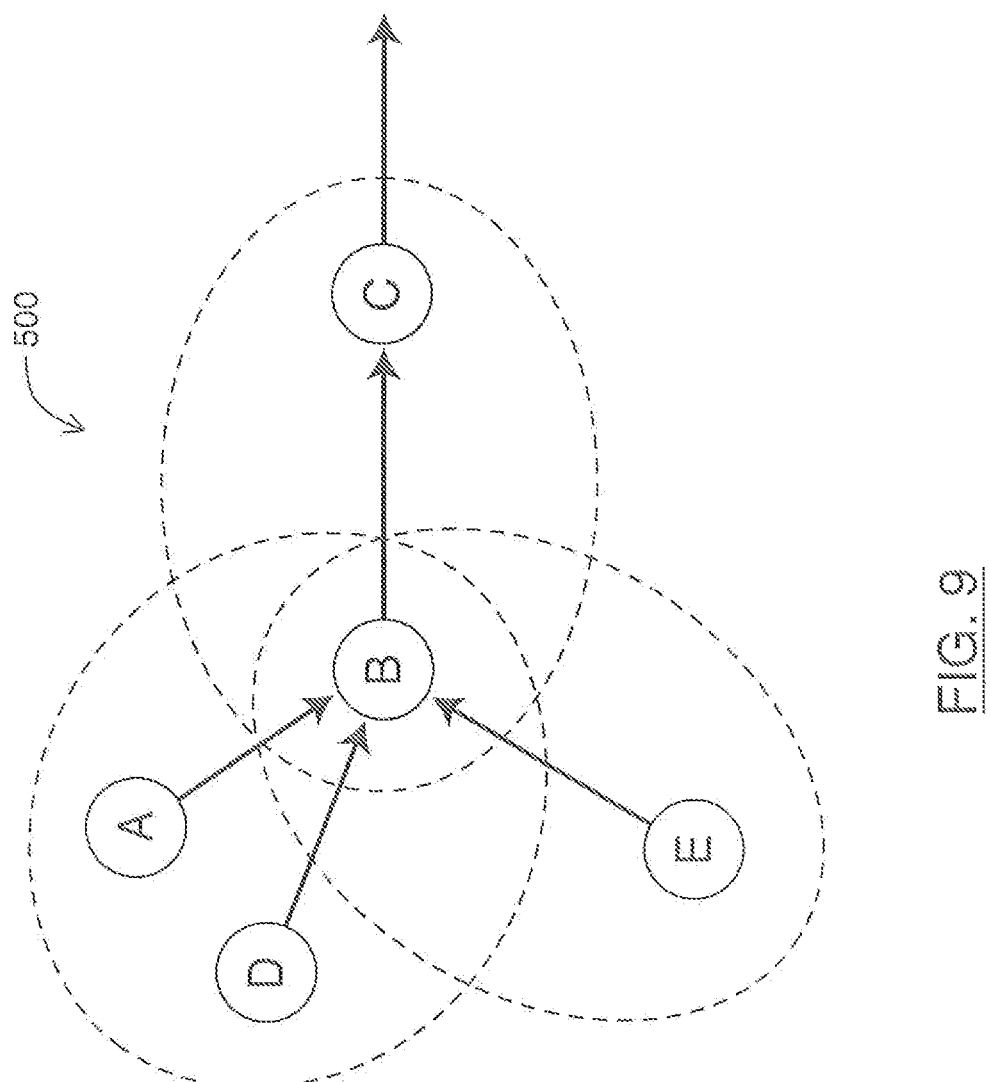
FIG. 9 illustrates a bottleneck node surrounded by many neighbors.

FIG. 9 illustrates a situation where a bottleneck may occur. Here node B has four neighbor nodes A, D, E and C. Here node B has to follow the schedule of 4 other nodes, while node E, for example, only has to follow the schedule of node B. However, node E may be demanded by node B to throttle the frequency of its scheduled data transmission, so that node B consumes less energy. To do so node E may choose an interleave factor that depends on the number of neighbors of node B. If based on Table 1, node E will consequently use an interleave factor of 2, since node B has 4 neighbors. Accordingly, node E reduces the frequency of its scheduled data transmission by a factor of 2, such that it only transmits scheduled data at every second scheduled data transmission period.

The inventor recognizes that the transmission of beacons from a increasing number of neighbor nodes does not necessarily cause an additional strain on a node receiving the beacons, for example during a beacon scan, because all beacon transmission attempts are made within the beacon interval of fixed duration and in one operating mode the receiving node always scans for a duration of time equal to the duration of the beacon interval. However, depending on the protocol used for resolving contentions, when a node has a high neighbor density, a high number of beacons from many nodes in the same range may cause an increase in the number of collisions caused by beacon transmission attempts. Therefore, it may be beneficial to also slow down the transmission of the beacons. In one embodiment, a node employing interleave applies the same interleave factor to its beacon transmissions as it does for its scheduled data transmissions. Therefore the node transmits a beacon every few beacon periods rather than within every single beacon period. It will be appreciated that by decreasing the number of beacon attempts per beacon period, the number of collisions of beacon transmissions will also decrease, thereby increasing beacon channel efficiency. Applying interleave to beacon transmission will for example allow mobile nodes to subscribe to the scheduled data of new neighbor nodes more quickly.

In a variation of the above embodiment, a node does not transmit a beacon, unless the time between the start of the beacon period and the time of its next scheduled data transmission is below a certain limit. For example, this limit may be set to be the duration of one beacon period. In this case, a node will only transmit a beacon if a scheduled data transmission is set to occur in that beacon period. It will be appreciated that if the beacon period 121 is longer in duration than the scheduled data transmission period 122 and the node only transmits scheduled data every few periods due to interleave, then the node will transmit a beacon only as often it transmits scheduled data. In this way, the transmission of beacons is made dependent on the interleave being applied. Furthermore, when the scheduled data transmission information 132 is given as a relative time, this relative time may exactly be the time between the start of a beacon period and the time of the next transmission of scheduled data. Therefore, in this case, no extra complexity is added.

The steps of a method in accordance with any of the embodiments described herein may be provided as executable software instructions stored on computer-readable media. Such steps may not be required to be performed in any particular order, whether or not such steps are described in claims or otherwise in numbered or lettered paragraphs.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the embodiments and non-limiting and it will be understood by persons skilled in the art that other variants and modifications may be made without departing from the scope of the embodiments as defined in the claims appended hereto.

The invention claimed is:

1. A method for a device to communicate in one operational mode over a wireless network, the method comprising:
   transmitting a beacon according to a media access control protocol during a beacon interval of a beacon period, the beacon comprising scheduled data transmission information;
   receiving one or more neighbor beacons transmitted by one or more neighbor devices according to the media access control protocol during the beacon interval of the beacon period, each neighbor beacon comprising neighbor scheduled data transmission information;
   periodically transmitting scheduled data according to the scheduled data transmission information;
   periodically listening for neighbor scheduled data according to the neighbor scheduled data transmission information; and
   allowing the device to enter into a different operational mode;
   wherein the scheduled data is periodically transmitted according to a scheduled data transmission period and wherein the beacon period and the scheduled data transmission period are independent.

2. The method of claim 1, wherein the scheduled data comprises beacon synchronization information.

3. The method of claim 1, wherein the beacon further comprises spread spectrum sequence synchronization information.

4. The method of claim 1, wherein the scheduled data transmission information comprises scheduled data transmission period information.

5. The method of claim 1, further comprising:
   performing a beacon scan, wherein the beacon scan comprises listening to at least a portion of the beacon period for neighbor beacons;
   if no neighbor beacons are detected during the beacon scan, randomly selecting a beacon period start time; and
   if at least one neighbor beacon is detected during the beacon scan, determining the beacon period start time based on the at least one neighbor beacon.

6. The method of claim 5, wherein if at least one neighbor beacon is detected during the beacon scan, the beacon period start time is determined to align with a beacon period start time of the at least one neighbor beacon.

7. The method of claim 1, further comprising:
   receiving neighbor scheduled data from the neighbor device, the neighbor scheduled data comprising a neighbor count, the neighbor count identifying a number of devices in communication with the neighbor device; and
   automatically adjusting the scheduled data transmission period based on the neighbor count.

8. A non-transitory computer-readable medium upon which a plurality of instructions are stored, the instructions for performing the steps of the method as claimed in claim 1.

9. The method of claim 1, further comprising:
   performing a plurality of beacon scans, wherein each of the beacon scans comprises listening to at least a portion of the beacon period for neighbor beacons;
   if no neighbor beacons are detected during the beacon scans, randomly selecting a beacon period start time; and
   if at least one neighbor beacon is detected during one or more of the beacon scans, determining the beacon period start time based on the at least one neighbor beacon.

10. A device for communicating over a wireless network, the device comprising:
    a transmitter;
    a receiver; and
    a processor coupled to the transmitter and receiver, the processor configured to, in one operational mode:
       cause the transmitter to transmit a beacon according to a media access control protocol during a beacon interval of a beacon period, the beacon comprising scheduled data transmission information;
       cause the receiver to receive one or more neighbor beacons transmitted by one or more neighbor devices according to the media access control protocol during the beacon interval of the beacon period, each neighbor beacon comprising neighbor scheduled data transmission information;
       cause the transmitter to periodically transmit scheduled data according to the scheduled data transmission information;
       cause the receiver to periodically listen for neighbor scheduled data according to the neighbor scheduled data transmission information; and
       allow the device to enter into a different operational mode;
    wherein the scheduled data is periodically transmitted according to a scheduled data transmission period and wherein the beacon period and the scheduled data transmission period are independent.

11. The device of claim 10, wherein the scheduled data comprises beacon synchronization information.

12. The device of claim 10, wherein the beacon further comprises spread spectrum sequence synchronization information.

13. The device of claim 10, wherein the scheduled data transmission information comprises scheduled data transmission period information.

14. The device of claim 10, wherein the processor is further configured to:
    perform a beacon scan, wherein the beacon scan comprises listening to at least a portion of the beacon period for neighbor beacons;
    if no neighbor beacons are detected during the beacon scan, randomly select a beacon period start time; and if at least one neighbor beacon is detected during the beacon scan, determine the beacon period start time based on the at least one neighbor beacon.

15. The method of claim 14, wherein if at least one neighbor beacon is detected during the beacon scan, the beacon period start time is determined to align with a beacon period start time of the at least one neighbor beacon.

16. The device of claim 10, wherein the processor is further configured to:
   receive neighbor scheduled data from the neighbor device, the neighbor scheduled data comprising a neighbor count, the neighbor count identifying a number of devices in communication with the neighbor device; and
   automatically adjust the scheduled data transmission period based on the neighbor count.

17. The device of claim 10, wherein the processor is further configured to:
   perform a plurality of beacon scans, wherein each of the beacon scans comprises listening to at least a portion of the beacon period for neighbor beacons;
   if no neighbor beacons are detected during the beacon scans, randomly select a beacon period start time; and
   if at least one neighbor beacon is detected during one or more of the beacon scans, determine the beacon period start time based on the at least one neighbor beacon.

\* \* \* \* \*